US012535684B2

(12) United States Patent
Cakmakci et al.

(10) Patent No.: US 12,535,684 B2
(45) Date of Patent: Jan. 27, 2026

(54) EYEBOX STEERING AND FIELD OF VIEW EXPANSION USING A BEAM STEERING ELEMENT

(71) Applicant: GOOGLE LLC, Mountain View, CA (US)

(72) Inventors: Ozan Cakmakci, San Mateo, CA (US); Oscar Alberto Martinez, Mountain View, CA (US); Yi Qin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 156 days.

(21) Appl. No.: 17/922,737

(22) PCT Filed: May 12, 2020

(86) PCT No.: PCT/US2020/032430
§ 371 (c)(1),
(2) Date: Nov. 1, 2022

(87) PCT Pub. No.: WO2021/230856
PCT Pub. Date: Nov. 18, 2021

(65) Prior Publication Data
US 2023/0176383 A1     Jun. 8, 2023

(51) Int. Cl.
*G02B 27/01* (2006.01)
*G02B 27/28* (2006.01)
(Continued)

(52) U.S. Cl.
CPC ....... *G02B 27/0172* (2013.01); *G02B 27/288* (2013.01); *G02F 1/0136* (2013.01);
(Continued)

(58) Field of Classification Search
CPC .................................................. G02B 27/172
See application file for complete search history.

(56) References Cited

U.S. PATENT DOCUMENTS

| 9,335,548 B1 | 5/2016 | Cakmakci et al. |
| 2018/0074340 A1 | 3/2018 | Robbins et al. |
| (Continued) | | |

FOREIGN PATENT DOCUMENTS

WO          2019185510 A1    10/2019

OTHER PUBLICATIONS

International Search Report and Written Opinion mailed Feb. 3, 2021 for corresponding International Application No. PCT/US2020/032430, 16 pages.

(Continued)

*Primary Examiner* — Edmond C Lau

(57) ABSTRACT

An eyewear device includes a lightguide having a world-side surface and an eye-side surface, a display oriented to emit light toward the lightguide, and a beam steering element that includes a first polarization grating positioned along an optical path between the display. The first polarization grating diffracts light emitted by the display into orders having different polarizations and the orders are selectively conveyed into different eyeboxes. The eyewear device also includes a frame that supports the lightguide, the display, and the first polarization grating. In some cases, the different polarizations include a right circular polarization or a left circular polarization and the beam steering element includes a polarization dependent filter that filters right circularly polarized light in a first state and left circularly polarized light in a second state.

12 Claims, 9 Drawing Sheets

(51) Int. Cl.
    *G02F 1/01*    (2006.01)
    *G02F 1/31*    (2006.01)
(52) U.S. Cl.
    CPC ........ *G02F 1/31* (2013.01); *G02B 2027/0123* (2013.01); *G02B 2027/0178* (2013.01); *G02F 2203/07* (2013.01); *G02F 2203/24* (2013.01)

(56) References Cited

U.S. PATENT DOCUMENTS

| | | |
|---|---|---|
| 2018/0113309 A1 | 4/2018 | Robbins et al. |
| 2019/0056636 A1 | 2/2019 | Cheng et al. |
| 2019/0265477 A1 | 8/2019 | Perreault et al. |
| 2019/0318706 A1 | 10/2019 | Peng et al. |
| 2020/0081252 A1 | 3/2020 | Jamali et al. |
| 2020/0271936 A1* | 8/2020 | Leibovici ............ G03H 1/0244 |
| 2021/0011300 A1* | 1/2021 | Leister ................ G02B 5/3016 |
| 2021/0191122 A1 | 6/2021 | Yaroshchuk et al. |
| 2021/0302744 A1 | 9/2021 | Saitoh et al. |
| 2022/0179257 A1 | 6/2022 | Oh |

OTHER PUBLICATIONS

Cakmakci, O. et al., "31-4: Invited Paper: 3D Eyebox in Augmented and Virtual Reality Optics", SID Symposium Digest of Technical Papers, vol. 50, No. 1; Jun. 2019; pp. 438-441.

Choi et al "Holographic Near-Eye display with continuously expanded eyebox using two-dimensional replication and angular spectrum wrapping", Optics Express, vol. 28, No. 1; Jan. 6, 2020; pp. 533-547.

McManamon, P. et al., "A Review of Phased Array Steering for Narrow-Band Electrooptical Systems", Proceedings of the IEEE, 97, No. 6; May 19, 2009; pp. 1078-1096.

Oh, C. et al., "Achromatic Diffraction from Polarization Gratings with High Efficiency", Optics Letters, vol. 33, No. 20; Oct. 15, 2008; pp. 2287-2289.

International Preliminary Report on Patentability mailed Nov. 24, 2022 for PCT Application No. PCT/US2020/032430, 10 pages.

Translation of Japanese Notice of Grounds of Rejection mailed Feb. 20, 2024 for JP Application No. 2022-568918, 14 pages.

Translation of Notification of First Office Action mailed Apr. 10, 2025 for CN Application No. 202080100717.7, 19 pages.

Communication pursuant to Article 94(3) EPC mailed Feb. 26, 2025 for EP Application No. 20729475.2, 5 pages.

Translation of Korean Notice of Allowance mailed May 7, 2025 for KR Application No. 1020227041510, 4 pages.

Translation of Japanese Office Action mailed May 27, 2025 for JP Application No. 2024168877, 5 pages.

* cited by examiner

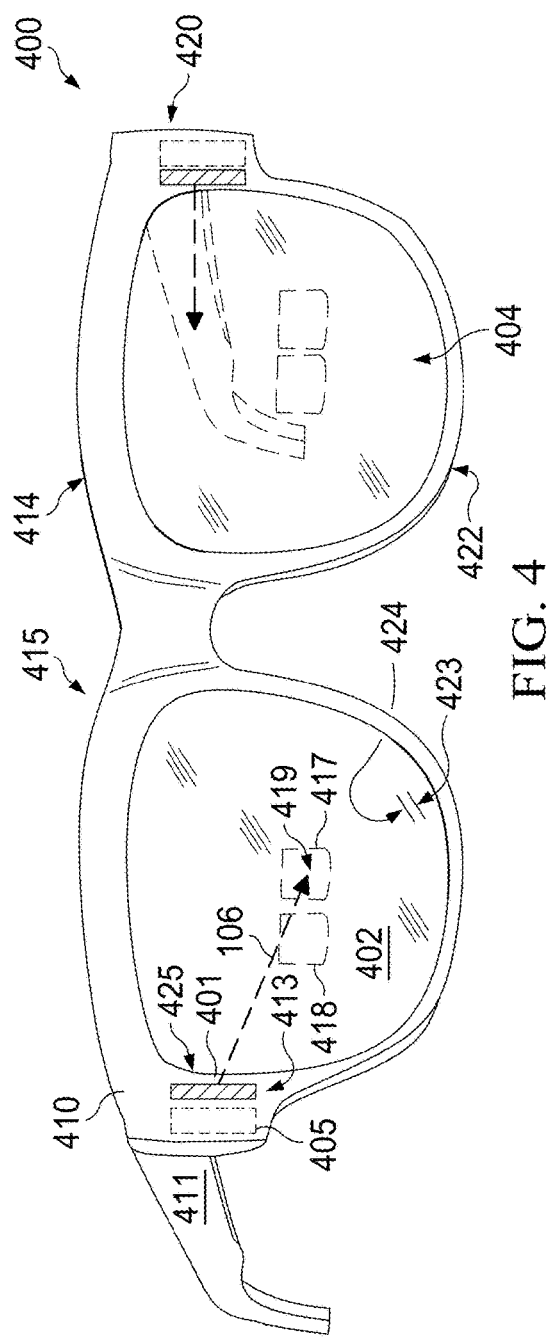
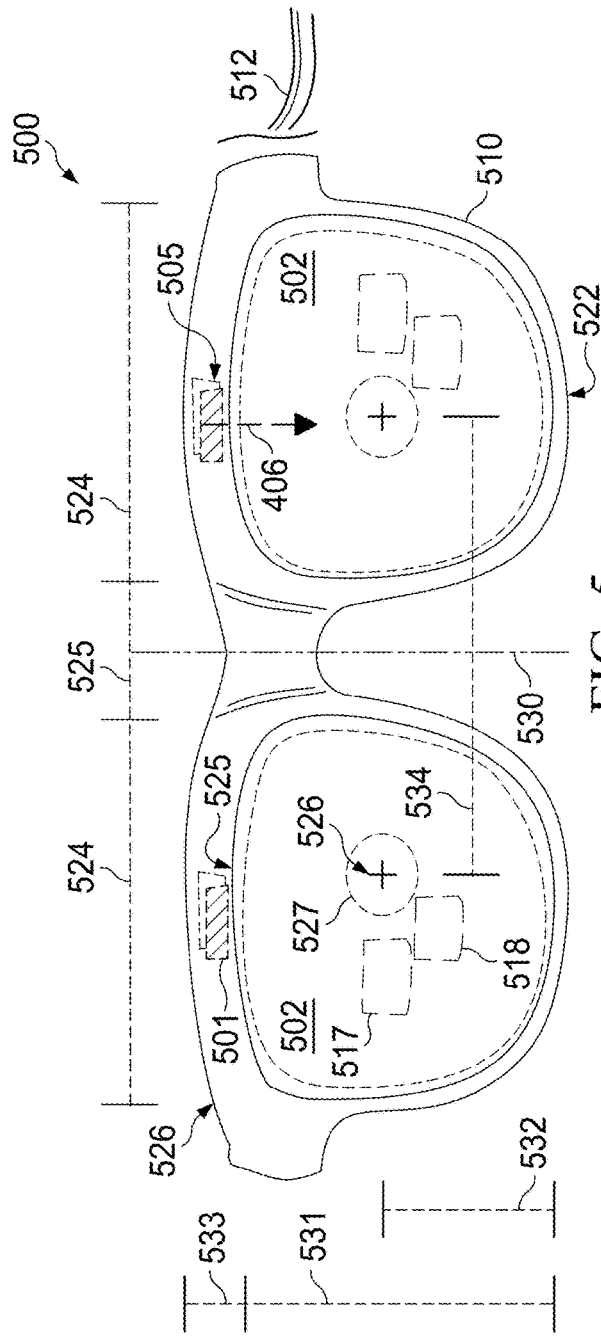
FIG. 4
FIG. 5

EYEBOX STEERING AND FIELD OF VIEW EXPANSION USING A BEAM STEERING ELEMENT

CROSS-REFERENCE TO RELATED APPLICATIONS

The present application is a U.S. National Stage under 35 U.S.C. § 371 of International Patent Application Serial No. PCT/US2020/032430, entitled "EYEBOX STEERING AND FIELD OF VIEW EXPANSION USING A BEAM STEERING ELEMENT", and filed on May 12, 2020, the entirety of which is incorporated by reference herein.

BACKGROUND

Wearable electronic eyewear devices include optical systems that magnify a display image and deliver a virtual image into the field of view (FOV) of a user. The device also allows the user to see the outside world through a lens or see-through eyepiece. Some wearable electronic eyewear devices incorporate a near-to-eye optical system to display content to the user. For example, previous eyewear designs include a microdisplay ("display") positioned in a temple or rim region of a head wearable frame like a conventional pair of glasses. The display generates images such as computer-generated images (CGI) that are conveyed into the FOV of the user by optical elements such as curved lightguides deployed in the lens (or the see-through eyepiece) of the head wearable frame. The wearable electronic eyewear device can therefore serve as a hardware platform for implementing augmented reality (AR). Different modes of augmented reality include optical see-through augmented reality, video see-through augmented reality, or opaque (VR) modes.

SUMMARY

Electronically-enhanced eyewear devices potentially have multiple practical and leisure applications but the development and adoption of wearable electronic eyewear devices has been limited by constraints imposed by the quality, cost, size, weight, thickness, field of view, and efficiency of the optical systems used to implement existing eyewear devices. For example, the geometry and physical constraints of conventional designs lead to a low field of view (FOV) for the display. Furthermore, the population of potential users exhibits a large range of facial geometries characterized by a distribution of nose geometries, a distribution of distances from ear apex to ear apex, and a distribution of inter pupillary distances (i.e., a distance between centers of the user's pupils). A single wearable electronic eyewear device is not likely to provide an optimal experience for all users while meeting all the physical and geometric constraints of a wearable device. For example, a user only sees the entirety of the image displayed by the wearable electronic eyewear device if the user's pupils fall within an "eyebox" produced by the optical system implemented in the device. However, a conventional wearable electronic eyewear device produces a relatively small eyebox that does not encompass pupil locations throughout the entire distribution of facial geometries. Consequently, not all users are able to view the image displayed by the wearable electronic eyewear device.

One aspect of the proposed solution relates to an eyewear device, comprising a waveguide having a world-side surface and an eye-side surface; a display oriented to emit light toward the waveguide; a beam steering element comprising at least one of a first polarization grating and a polarization dependent filter positioned along an optical path between the display and the waveguide, the beam steering element being configured to operate in at least two different states, wherein, in a first state of the at least two different states, light is direct into a first eyebox and in a second state of the at least two different states, light is direct into a second eyebox differing in its dimensions, in particular in its volume from the first eyebox. In one embodiment the first polarization grating is configured to diffract light emitted by the display into orders having different polarizations, and to selectively convey the orders into different eyeboxes, an eyebox being defined as a three-dimensional volume in space for a pupil of an eye of a user of the eyewear device. Generally, an "eyebox" is produced by an emission cone for light emerging from the optical waveguide in the electronic eyewear device. Accordingly, the eyewear device with its beam steering element may be configured to provide emission cones of different geometries and/or dimension. As used herein, the term "eyebox" refers to a three-dimensional (3D) volume in space within which the pupil of an eye is positioned in order to satisfy one or more viewing experience criteria. One example of a viewing experience criterion is that the user sees four edges of a magnified virtual image. In that case, the eyebox is the 3D volume in space within which the user's pupil is positioned to see the four edges of the magnified virtual image. In some embodiments, the volume and orientation of the eyebox produced by an electronic eyewear device is evaluated based on a pupil diameter, an angular extent of an emission cone produced by the electronic eyewear device, a set of criteria, and thresholds for the criteria. Using a beam steering element in the eyewear device for example allows for selectively operating the eyewear device at least two different states that produce different eyeboxes. In a first state, light rays representing an image may be direct into a first eyebox and, in a second state, the light rays may be direct into a second eyebox.

In one embodiment, the eyewear device may be selectively placed in a first state or a second state by a user (e.g., using a switch, a button, or other device of the eyewear device) thereby moving a produced eyebox through a range corresponding to a first image and a second image. Thus, an effective size of the eyebox may for example be increased by implementing a switchable beam steering element. The size of the eyebox may be a measurable parameter that is used to address population coverage in an AR- or VR-based device. In many circumstances, the size of the eyebox determines how many users can see a display image when wearing the eyewear device. Using the techniques described herein, eyewear devices for AR and VR applications are created with a large eyebox to accommodate an increased number of people in the general population. A position or orientation of the eyebox may thus be shiftable from one position to another through use of the beam steering element. For example, the beam steering element may be switchable between at least two states that correspond to at least two different steering angles, under which light emerges from the beam steering element, and at least two different eyebox volumes.

In some embodiments, the different polarizations include a right circular polarization or a left circular polarization.

In some embodiments, the right circular polarization corresponds to a +1 order of the polarization grating and the left circular polarization corresponds to a −1 order of the polarization grating.

In some embodiments, the first polarization grating diffracts light by a positive offset angle for right circularly polarized light and a negative offset angle for left circularly polarized light.

In some embodiments, the first polarization grating is a substantially achromatic liquid crystal polarization grating.

Some embodiments of the eyewear device include a polarization dependent filter that filters the light received from the first polarization grating and the polarization dependent filter filters right circularly polarized light in a first state and left circularly polarized light in a second state.

Some embodiments of the eyewear device include a second polarization grating positioned proximate the eye-side surface of the lightguide, the second polarization grating being configured to selectively convey light emitted by the display into different fields of view (FOVs).

In some embodiments, the second polarization grating is configured to time multiplex content representative of the different FOVs to render a larger effective FOV as perceived by a user wearing the eyewear device.

In some embodiments, the second polarization grating comprises a switchable polarization grating that switches between polarizations to time multiplex the content representative of the different FOVs.

Another aspect of the proposed solution relates to an eyewear device, comprising a waveguide having a world-side surface and an eye-side surface; a display oriented to emit light toward the waveguide; a beam steering element comprising a polarization grating positioned along an optical path between the eye-side of the waveguide and an eye of a user of the eyewear device, e.g., proximate the eye-side surface of the waveguide, the polarization grating being configured to selectively convey light emitted by the display into different fields of view, FOVs; and a frame that supports the waveguide, the display, and the polarization grating. In some embodiments an additional beam steering element may additionally be included that can be switched between multiple states to provide eyeboxes of different eyebox volumes, as discussed herein.

Generally, the proposed solution in particular relates to an eyewear device comprising a waveguide having a world-side surface and an eye-side surface; a display oriented to emit light toward the waveguide; at least one beam steering element, and a frame that supports the waveguide, the display, and the at least one beam steering element, wherein the beam steering element is configured to (a) diffract light emitted by the display into orders having different polarization and to selectively convey the orders into different eyeboxes and/or to (b) selectively convey light emitted by the display into different fields of view, FOVs.

An embodiment of a proposed eyewear device may be configured to implement an embodiment of a proposed method. Accordingly, features discussed herein in connection with an embodiment of a proposed eyewear device also apply to a corresponding embodiment of a proposed method and vice versa.

In some embodiments, a method is disclosed that includes emitting light from a display towards a first polarization grating in an eyewear device that comprises a lightguide having a world-side surface and an eye-side surface, diffracting the light received from the first polarization grating into orders having different polarizations, and selectively conveying, via the first polarization grating, one of the diffracted orders into one of a plurality of eyeboxes via the eye-side surface of the lightguide.

In some embodiments, selectively conveying the light emitted by the display into one of the plurality of eyeboxes includes generating orders having a right circular polarization and a left circular polarization.

In some embodiments, the right circular polarization corresponds to the +1 order of the polarization grating and the left circular polarization corresponds to the −1 order of the polarization grating.

In some embodiments, diffracting the light emitted by the display includes diffracting the light by a positive offset angle for right circularly polarized light and a negative offset angle for left circularly polarized light.

In some embodiments, the first polarization grating is a substantially achromatic liquid crystal polarization grating.

In some embodiments, selectively conveying one of the diffracted orders comprises filtering, at a polarization dependent filter, the right circularly polarized light in a first state and the left circularly polarized light in a second state.

Some embodiments of the method include selectively conveying, at a second polarization grating positioned proximate the eye-side surface of the lightguide, the light emitted by the display into different fields of view (FOVs).

In some embodiments, selectively conveying the light includes time multiplexing content representative of the different FOVs to render a larger effective FOV as perceived by a user wearing the eyewear device.

In some embodiments, time multiplexing the content includes switching between circular polarizations associated with the different FOVs.

In some embodiments, an eyewear device is disclosed that includes a lightguide having a world-side surface and an eye-side surface, a display oriented to emit light toward the lightguide, a polarization grating positioned proximate the eye-side surface of the lightguide, the polarization grating being configured to selectively convey light emitted by the display into different fields of view (FOVs), and a frame that supports the lightguide, the display, and the polarization grating.

In some embodiments, the beam steering element is configured to time multiplex content representative of the different FOVs to render a larger effective FOV as perceived by a user wearing the eyewear device.

In some embodiments, the beam steering element includes a switchable polarization grating that switches between polarizations to time multiplex the content representative of the different FOVs.

In some embodiments, a method is provided that includes emitting light from a display towards a first polarization grating in an eyewear device that comprises a waveguide having a world-side surface and an eye-side surface. The method also includes selectively conveying, via the first polarization grating, light emitted by the display into different fields of view, FOVs.

In some embodiments, selectively conveying the light emitted by the display includes time multiplexing content representative of the different FOVs to render a larger effective FOV as perceived by a user wearing the eyewear device.

In some embodiments, selectively conveying the light emitted by the display includes switching between polarizations to time multiplex the content representative of the different FOVs using a switchable polarization grating.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 4 illustrates a perspective view of an electronic eyewear device having a beam steering element and a display for each user eye according to some embodiments.

FIG. 5 illustrates a front view of a rim frame portion of alternative embodiment of an eyewear device like the eyewear device of FIG. 4 according to some embodiments.

DETAILED DESCRIPTION

FIGS. 1-10 disclose an optical imaging system that is implemented in wearable electronic eyewear devices to produce eyeboxes of different dimensions, in particular of different volumes and therefore, for example, to produce larger (or adjustable) eyeboxes by deploying a first beam steering element along an optical path between a display that generates images and an optical lightguide that directs the images towards an eye of a user when the user is wearing the device. Some embodiments of the first beam steering element include a switchable polarization grating that shifts the eyebox by different offsets depending on the order of the diffracted light rays that produce the eyebox. For example, the polarization grating produces orders of diffracted light and each order has an associated circular handedness. The polarization grating diffracts light by a positive offset angle for right circularly polarized light and a negative offset angle for left circularly polarized light. The location of the eyebox can therefore be switched by switching between right and left circular polarizations, which correspond to the +1 and −1 orders of the polarization grating. Some embodiments switch between right and left circular polarizations using a switchable polarization dependent filter. In some embodiments, the optical imaging system produces a larger field-of-view (FOV) by deploying a second beam steering element proximate an output region of the curved optical lightguide. The second beam steering element can include a switchable polarization grating that switches between polarizations to time multiplex content representative of different portions of the FOV (e.g., by interlacing frames that represent the different FOVs) to render a larger effective FOV as perceived by the user. Some embodiments of the wearable electronic eyewear device include the first beam steering element, the second beam steering element, or both the first and second beam steering elements.

Figure 1:
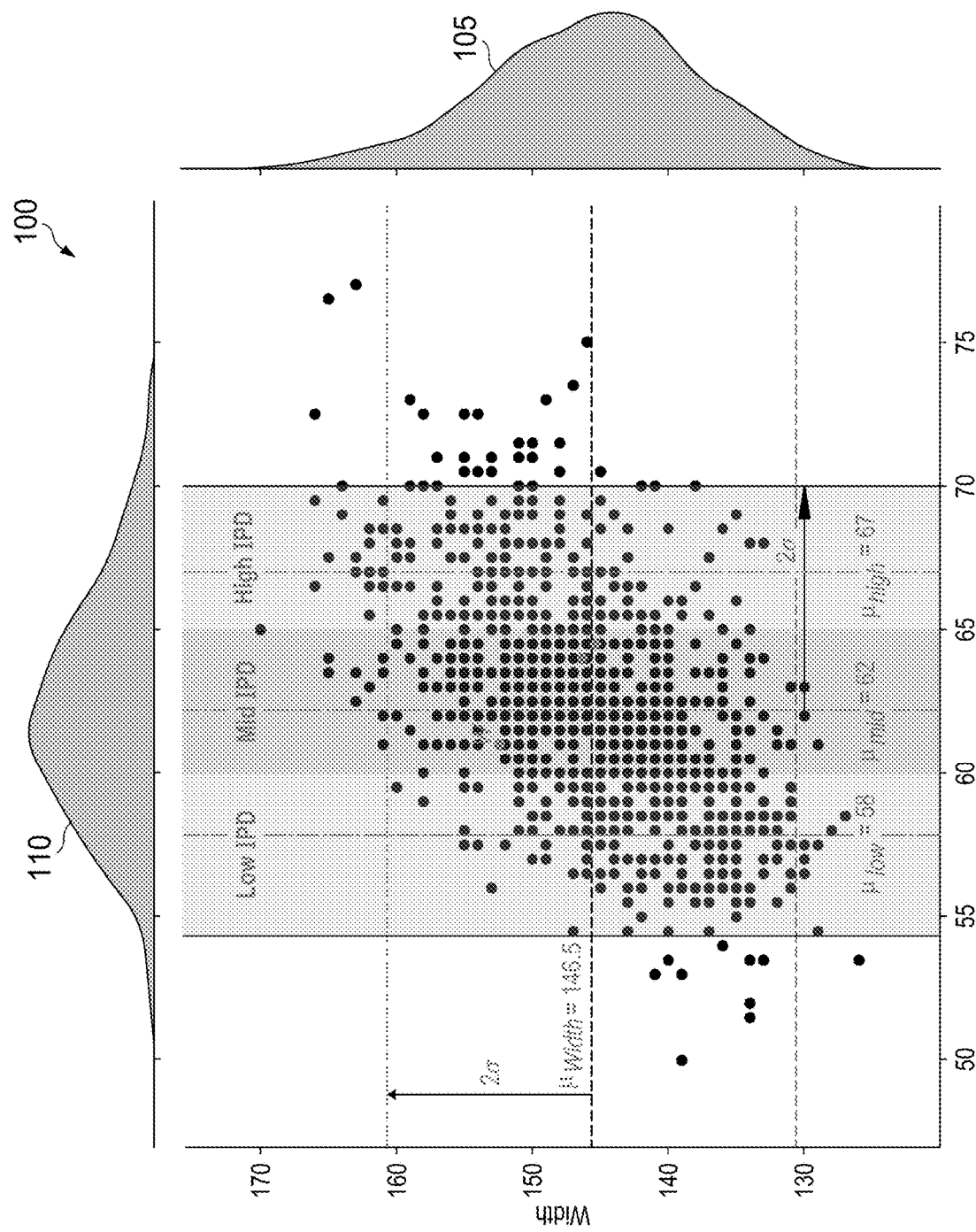
FIG. 1 is a scatterplot of head width distribution versus an inter-pupillary distance (IPD) distribution.

FIG. 1 is a scatterplot 100 of an ear apex distribution versus an inter-pupillary distance (IPD) distribution. The vertical axis of the scatterplot 100 indicates the width between the ear apexes of an individual (in millimeters, mm) and the horizontal axis indicate the IPD for the individual (in millimeters). Each point in the scatterplot 100 represents measured values of the width and the IPD for an individual. Numbers of individuals having measured values of each width are projected into the distribution 105 and numbers of individuals having measured values of each IPD are projected into the distribution 110. The distributions 105, 110 are characterized by mean values ($\mu$) and standard deviations ($\sigma$). For example, the IPD distribution 110 is characterized by:

$\mu_{IPD}$=62 mm
$\sigma_{IPD}$=3.9 mm

The width distribution 105 is characterized by:

$\mu_{EtE}$=145.6 mm
$\sigma_{EtE}$=7.5 mm where EtE indicates the ear-to-ear width.

Figure 2:
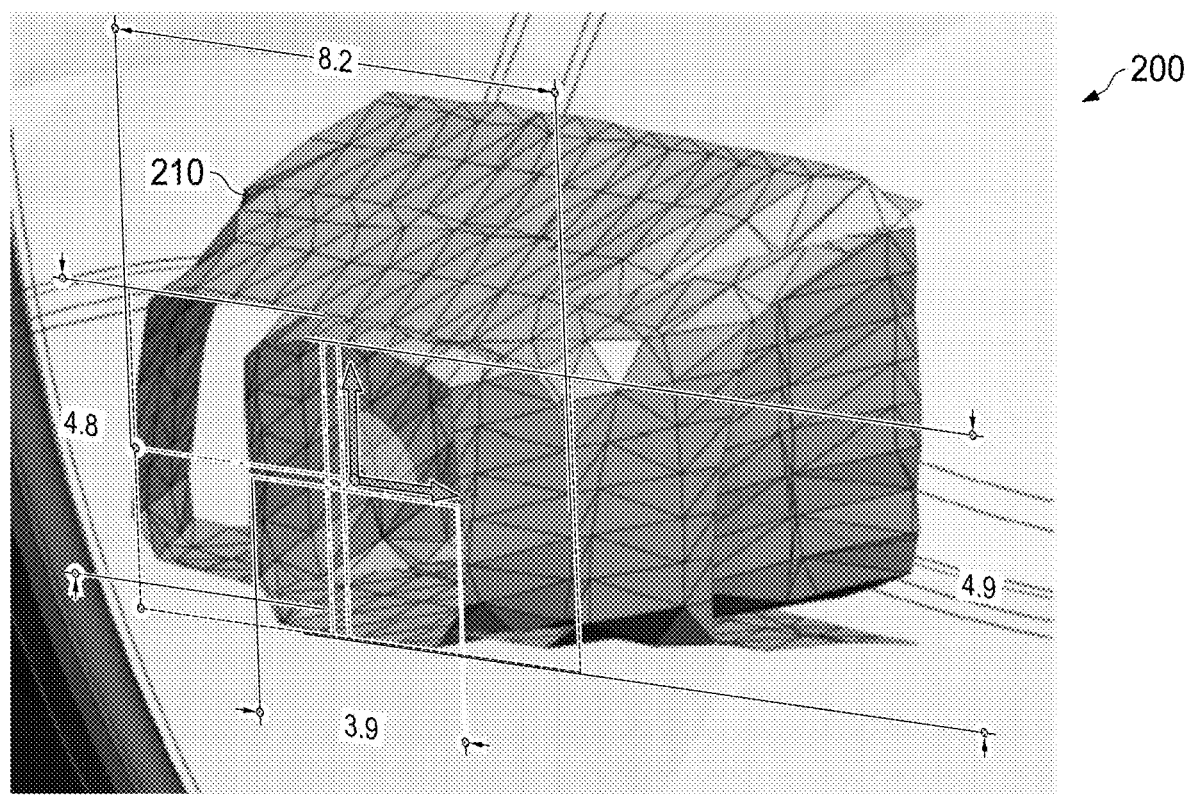
FIG. 2 illustrates two comparisons of eyeboxes that are produced with different emission cones for light emerging from an optical lightguide in an electronic eyewear device.
Figure 2:
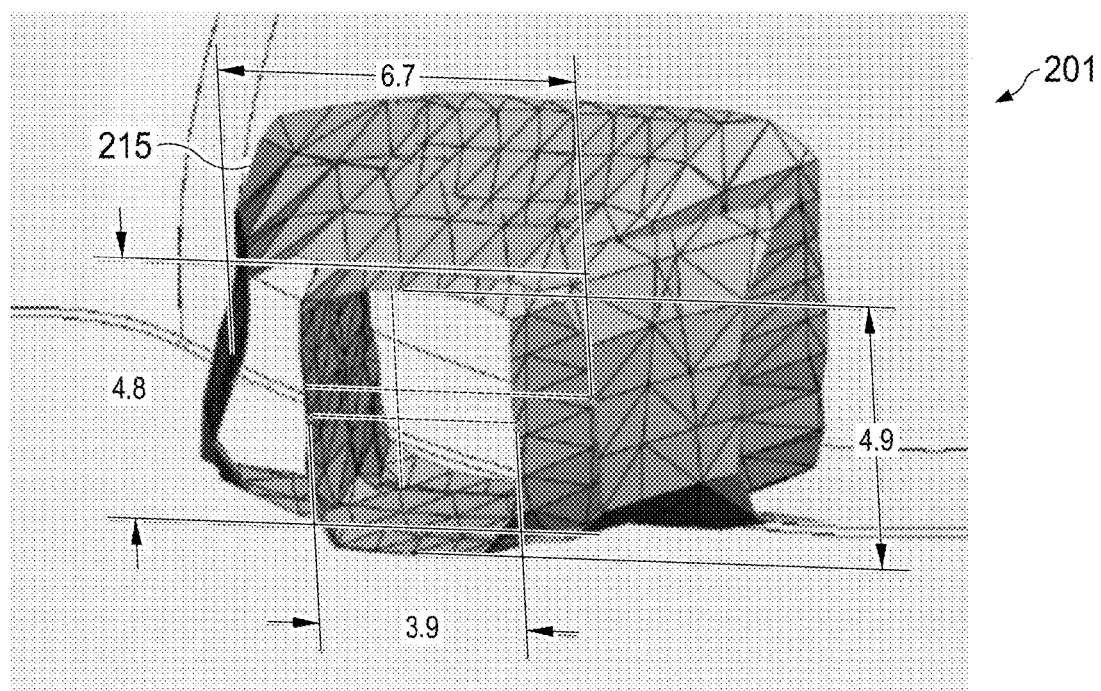

FIG. 2 illustrates two comparisons 200, 201 of eyeboxes 210, 215 that are produced with different emission cones for light emerging from an optical lightguide in an electronic eyewear device. As used herein, the term "eyebox" refers to a three-dimensional (3D) volume in space within which the pupil of an eye is positioned to satisfy one or more viewing experience criteria. One example of a viewing experience criterion is that the user can see four edges of a magnified virtual image. In that case, the eyebox is the 3D volume in space within which the user's pupil is positioned to see the four edges of the magnified virtual image. In some embodiments, the volume and orientation of the eyebox produced by an electronic eyewear device is evaluated based on a pupil diameter, an angular extent of an emission cone produced by the electronic eyewear device, a set of criteria, and thresholds for the criteria.

The eyebox 210 is produced using an emission cone having a full width/half maximum (FWHM) of 50° in the horizontal dimension and 30° in the vertical dimension. The dimensions of the eyebox 210 are 8.2 mm in the x-direction and 4.8 mm in the y-direction. The eyebox 215 is produced using an emission cone having an FWHM of 30° in the horizontal dimension and 50° in the vertical dimension. The dimensions of the eyebox 215 are 6.7 mm in the x-direction and 4.8 mm in the y-direction. Thus, the additional 20° FWHM improvement in the horizontal dimension increases the eyebox 210 by 1.5 mm relative to the eyebox 215. In the illustrated embodiments, the thickness of the optical system limits the size of the eyeboxes 210, 215 along the y-direction.

Figure 3:
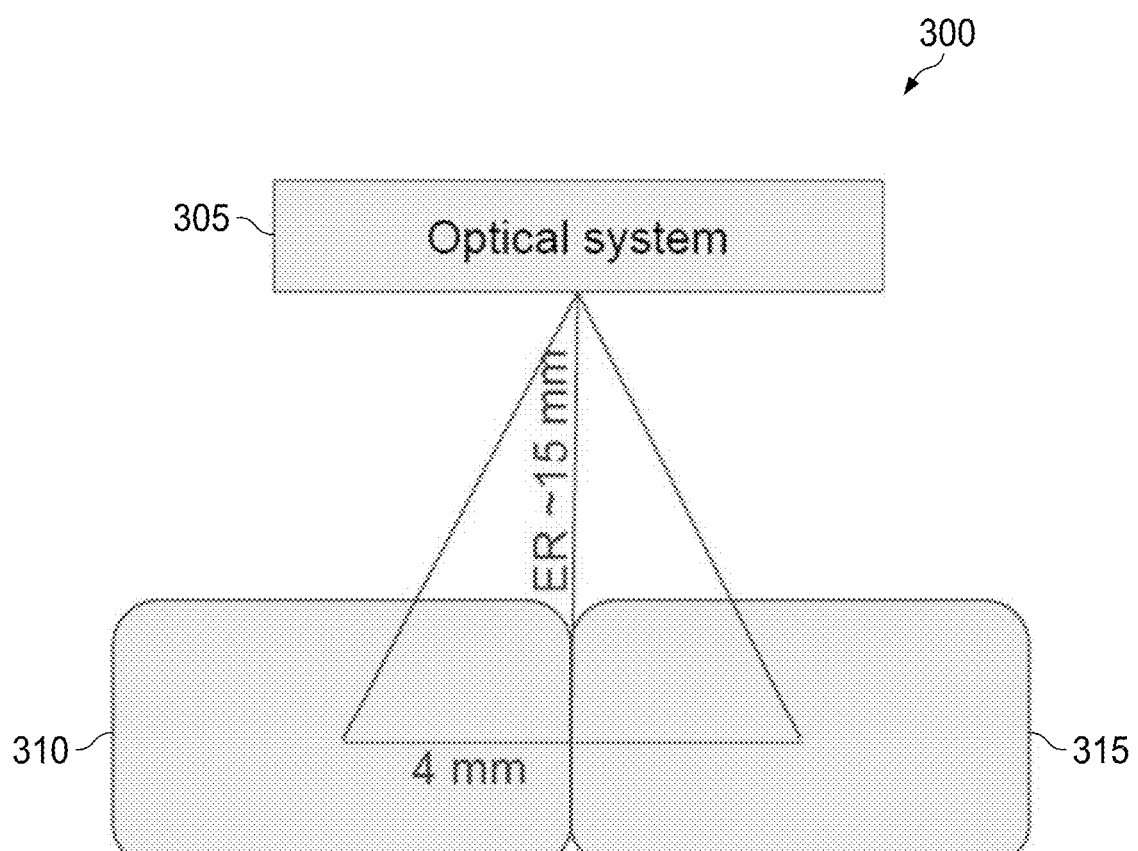
FIG. 3 is a block diagram of a design of an electronic eyewear device that provides an expanded eyebox area at the nominal eye relief plane according to some embodiments.

FIG. 3 is a block diagram of a design 300 of an electronic eyewear device that provides an expanded eyebox according to some embodiments. The design 300 includes an optical system 305 that is implemented using a display to generate an image, a beam steering element to selectively modify directions of light rays representing the image, and an optical lightguide to direct light rays representing the image towards a user's eyes, as discussed herein. In the illustrated embodiment, the optical system 305 selectively operates in one of two states that produce different eyeboxes. In a first state, the optical system 305 directs light rays representing the image into a first eyebox 310 and, in the second state, the optical system 305 directs the light rays into a second eyebox 315. Thus, the effective eyebox produced by the optical system 305 is equal to the combination of the first eyebox 310 and the second eyebox 315. The optical system 305 produces an emission cone of 50°×30° FWHM and steering angles for the eyeboxes 310, 315 are ∓15°, respectively. Some embodiments of the optical system 305 operate in more than two states that produce more than two different (potentially overlapping) eyeboxes. The optical system 305 can also produce different FWHM emission cones or steering angles.

FIG. 4 illustrates a perspective view of an electronic eyewear device 400 having a beam steering element 401 and a display 405 for each user eye according to some embodiments. The beam steering element 401 includes a polarization dependent grating and a switchable polarization dependent filter in some embodiments, as discussed herein. The device 400 includes at least a frame 410, a pair of lightguides 402, and a beam steering element 401 and a display 405 for each user eye. The beam steering element 401 is also referred to as a polarization grating lens that alters at least one property of light passing therethrough. The device 400 broadly illustrates components and their arrangement for use in various types of eyewear devices that provide AR- and VR-based vision. The device 400 provides binocular AR-based vision. The user eyes are not illustrated in this figure for sake of clarity.

The device 400 has an appearance of ordinary glasses and has little to no light leakage from the displays 405 mounted therein. In the illustrated embodiment, the displays 405 and the beam steering elements 101 are positioned at respective temple locations 120 in the device 400. In some embodiments, the lightguides 402 are curved, and in other embodiments, the lightguides 402 are substantially planar. The frame 410 secures the lightguides 402 between a top side 114 and a bottom side 122 thereof. The frame 410 and the lightguides 402 are shaped into a form like lenses of an ordinary pair of eyeglasses. Generally, the lightguides 402 are transparent and operate as lenses for viewing. The lightguides 402 are positioned in front of a user and direct light 406 from the respective displays 405 toward the user eyes.

For a respective display 405, each lightguide 402 includes a surface having a dielectric mirror coating that acts as a combiner where light 406 from the display 405 and light 404 entering from a world side 413 are combined into a resulting image 417 that is then directed toward the user eye at the eye-side 415 of the device 400. The light 404 from the world side 413 passes through the lightguides 402 to the eye-side 415 of the lightguide 402 and the light 404 originates from a viewable scene on the world-side 413 of the eyewear device 400.

As illustrated, each display 405 is mounted at an edge 425 of the lightguide 402, at the temple location 420 of a respective lightguide 402, and each display 405 is positioned inside or proximate to the frame 410. The lightguide 402 allows ambient light 404 to combine with display light 406 reflected at the combiner surface which is not separately labeled in this figure for sake of clarity. The frame 410 includes two arms 411 that extend from a temple location of the frame 410 on respective sides of the frame 410 toward and over ears of the user (not illustrated).

In some embodiments, the device 400 includes or houses components to receive and provide an image data signal to the displays 405. The image data signal is a source input for the display light 406. For example, one arm 411 includes wireless components for receiving a wireless signal that includes the image data signal. Power is provided by a local energy source such as a battery, solar panel, or other form of energy local to the device 400. In another example, a cord (not illustrated) serves as a mechanism to provide power from an external source to various components including the displays 405 and their respective electronic packages. Besides having wires for power, one or more wires in the device 400 deliver the image data signal to the displays 405. In certain embodiments, the image data signal originates from a computing device or other display driving data source (not illustrated).

The placement of the display 405 at an outside lateral side of the lightguide 402 is one example of placement of the display 405. The displays 405 in other embodiments are positioned at or in a top portion of the frame 410. Each lightguide 402 includes an eye-side surface 424 and a world-side surface 423. Display light 406 is reflected between these surfaces 423, 424 at least once on each surface 423, 424 before reaching the user eye.

According to certain embodiments, each of the lightguide surfaces 423, 424 is curved and is spherical in at least one dimension (e.g., uniform along a fixed radius with respect to a focal point of the respective lightguide 402), and each of these surfaces 423, 424 has a similar or approximately a same sized characteristic dimension (e.g., spherical dimension, radius, set of curvature parameters) as each other so as to implement a zero optical power (diopter) optical see-through function. The eyeside and worldside surfaces can also be designed to integrate prescription correction as part of the lightguide.

For sake of description, the world-side surface 423 is a first surface and the eye-side surface 424 is a second surface. Each of the surfaces 423, 424 is provided by a same or a different physical component in the device 400. A surface 425 of the lightguide 402 adjacent to the display 405 and the beam steering element 401, according to certain embodiments, is curved or freeform so as to correct for astigmatism, if any, with respect to the display 405 and light 406 emitted therefrom due to the particular arrangement of components of the device 400. The surface 425 of the lightguide 402 adjacent to the display 405 is a third surface of the device 400 and is curved in one or two dimensions with respect to the resulting image 417 at the eye-side 415 of the device 400.

Another (fourth) surface of the lightguide 402, such as a surface at the combiner 419, provides a final reflection of light 406 from the display 405 toward a user eye, and this fourth surface of the lightguide 402 is also curved and curved in a freeform manner in at least some embodiments. This final surface is referred to equally herein as the combiner 419 or the combiner surface. The image 417 reflected therefrom is referred to as a light field and is provided to the user eye. In other embodiments of the combiner 419, the final reflection surface of the lightguide 402 is a rotationally symmetric aspherically-shaped surface, an anamorphic aspherically-shaped surface, a toroid-shaped surface, a Zernike polynomial-shaped surface, a radial basis function-shaped surface, an x-y polynomial-shaped surface, or a non-uniform rational b-spline-shaped surface.

In operation, when the beam steering element 401 changes from a first state to a second state, the image 417 is shifted from a first position to a second position as illustrated by a second image 418. Although the shift between the first image 417 and the second image 418 is substantially in the vertical direction in FIG. 1, the shift is vertical or a combination of vertical and horizontal in other embodiments. In some embodiments, the first image 417 and its location on a surface of the combiner 419 overlaps with a location of the second image 418, but, for sake of clarity, is shown as a separate and distinct location. In between the first state and second state of the beam steering element 401, when the beam steering element 401 is off, a non-illustrated location of an image from the display 405 is projected and provided to the eye in between the first image 417 and the second image 418 as illustrated in one or more other figures.

In some embodiments, at least some of the components of the lightguide 402 of the device 400 operate, due to their arrangement relative to one another and their composition and shape, as an optical magnifier for the light 406 emitted from the display 405. The techniques described herein are applicable to all types of see-through devices, such as eyeglasses, helmets, head-mounted display (HMD) devices and windshields and enable optical merging of computer generated and real-world scenes to form a combined view even though just an eyewear device such as the eyewear device 400 is described and illustrated.

Selectively placing the eyewear device 400 in the first state or the second state (e.g., using a switch, a button, or other device that is not shown in FIG. 1 in the interest of clarity) moves the eyebox through a range corresponding to the first image 417 and the second image 418. Thus, an effective size of the eyebox is increased by implementing the switchable beam steering element 401. The size of the eyebox is a measurable parameter that is used to address population coverage in an AR- or VR-based device. In many circumstances, the size of the eyebox determines how many users can see a display image when wearing the HMD eyewear device 400. Using the techniques described herein, eyewear devices for AR and VR applications are created with a large eyebox to accommodate an increased number of people in the general population. A position or orientation of the eyebox including the images 417, 418 is shiftable from one position to another through use of the beam steering element 401. In general, the size of the eyebox is a factor of several variables and parameters associated with a particular device including: resolution of the display 405 and light emitting elements thereof, color uniformity in the light emitting elements, a field curvature, distortion, and pupil swim.

FIG. 5 illustrates a front view of a rim frame portion 510 of alternative embodiment of an eyewear device 500 like the eyewear device 400 of FIG. 4 according to some embodiments. Arms for the device 500 are not illustrated for sake of clarity. Dimensions of the device 500 are based on a pupil diameter 527 of approximately 4 mm positioned relative to a pupil center 526. The pupil diameter 527 is also referred to as pupil size. Each of the lightguides 502 for the left and right eyes (not illustrated) is based on a frame horizontal box distance 524 of approximately 53 mm, such as between 50 mm and 60 mm, and a frame vertical box distance 531 of approximately 44 mm, such as between 40 mm and 50 mm. The lightguides 502 are separated by a bridge length 525 of approximately 17.5 mm. The bridge length 525 is generally centered at a medial position 530 when the eyewear device 500 is worn by the user. A fitting height 532 is a distance from the bottom side 522 toward a top edge 526 of the lightguide 502 and the fitting height is approximately 23 mm from the bottom side 522 to the pupil center 526. The rim frame portion 510 is based on an inter-pupillary distance (IPD) 534 in a range of approximately 60 mm to 65 mm such as based on an IPD 534 of 62 mm with one standard deviation of approximately 3.9 mm. The devices 400, 500 and their components are sized to accommodate users having an IPD 534 of 62 mm and two standard deviations in this measurement. Arms, such as the arms 411 of the device 400, are sized and positioned for the devices 400, 500 to accommodate an ear apex in a range of approximately 140 to 150 mm such as 145.6 mm with one standard deviation of approximately 7.5 mm and two standard deviations of 15 mm.

In terms of example dimensions for the eyewear device 500, a thickness of certain embodiments of the lightguide 502 is up to approximately 5 mm, and preferably up to and within approximately 4 mm. Parts of the optics, including displays 505, take up about 3.5 mm of space hidden in the rim frame portion 510 of the device 500. A top portion of the rim frame portion 510 has a (top) rim thickness 233 of up to 5 mm with some embodiments having a rim thickness 233 of 3.5 mm or less and accommodate the various components including both optical and electronic components other than the lightguides 502.

In support of the electronic components including the displays 505 and PGs 201, an electronic cord 212 is illustrated and would be coupled to or part of one or more eyewear arms, the rim frame portion 510, or a combination of the same. That is, one or more of the eyewear arms 111 as illustrated in FIG. 1 house the cord 212 having two or more wires to power the various components including the displays 405 and their supporting electronic packages and to provide an image data signal to the displays 405 from a computing device or other display driving data source (not illustrated). In other embodiments, the rim frame portion 510 or one or more arms include or house components to receive and provide the signal wirelessly to the displays 405. In some embodiments, power is provided by a battery or other form of energy local to the device 500 or from a source external to the device 500.

In the illustrated embodiment, the displays 505 are positioned inside of a rim thickness 533 of the top portion of the rim frame portion 510 to provide an image of about a 3:1 ratio width-to-height. The corresponding thickness is approximately 3.5 mm of head space in a top of the rim frame portion 510 (within the rim thickness 233) for housing certain device components. For displays 505 producing an image 517, 518 of about an 8:1 ratio width-to-height, the head space within the rim thickness 533 is up to approximately 4 mm. To lighten a weight of the eyewear device 500, while not illustrated, certain embodiments are monocular in the AR- or VR-based vision (having just one lightguide 502, one display 505, and one beam steering element 501) in the device 500 while other embodiments have two displays 505 and two beam steering elements 501, for each of two lightguides 502.

Figure 6:
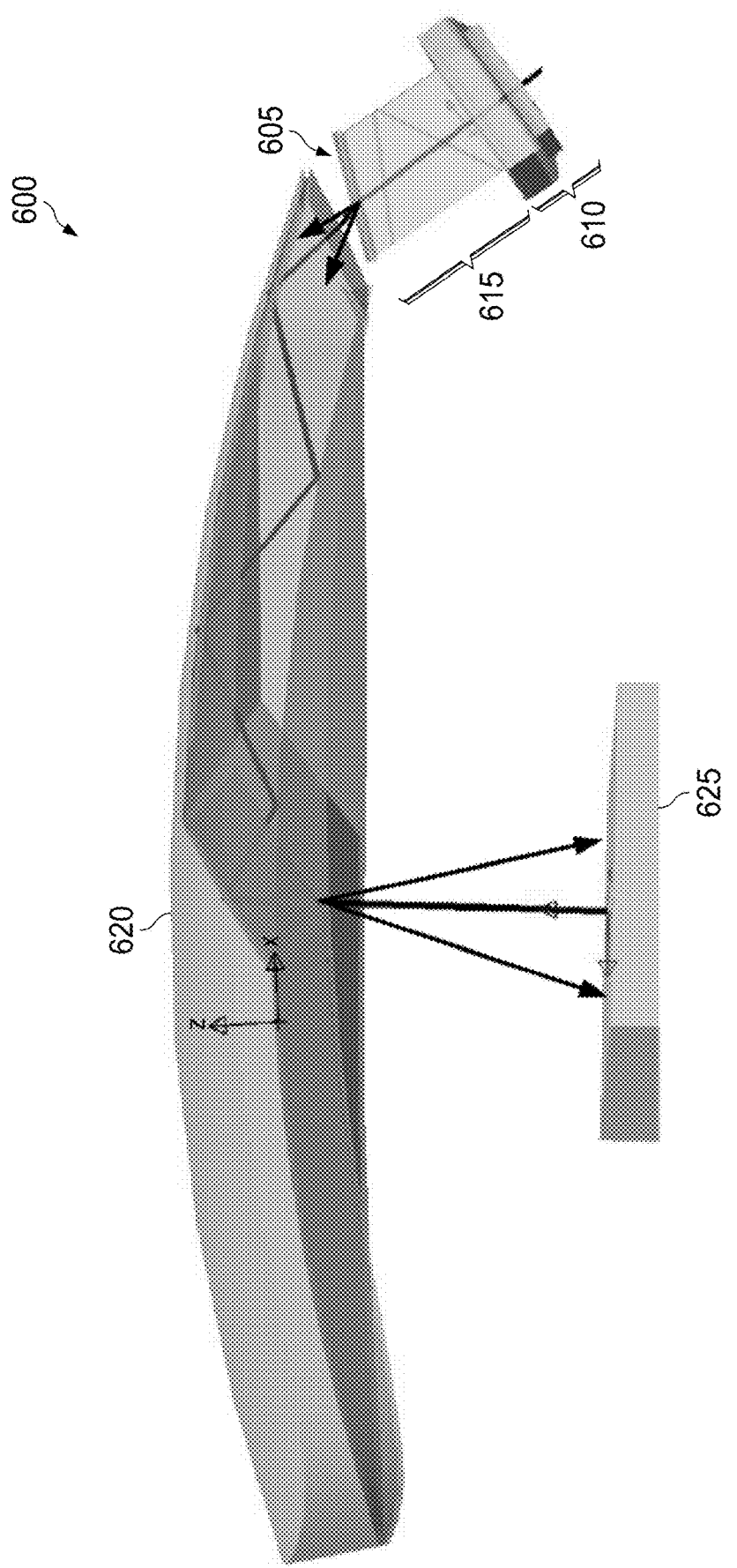
FIG. 6 is an illustration of an optical system that generates an enhanced eyebox using a beam steering element according to some embodiments.

FIG. 6 is an illustration of an optical system 600 that generates an enhanced eyebox using a beam steering element 605 according to some embodiments. The optical system 600 represents some embodiments of the optical system 305 shown in FIG. 3 and portions of the eyewear devices 400, 500 shown in FIGS. 4 and 5, respectively. The optical system 600 includes a micro display 610 that generates an image and provides light rays represented in the image to an angle filter 615 that provides the filtered light rays to the beam steering element 605. Some embodiments of the beam steering element 605 are implemented as a liquid crystal polarization grating, as discussed herein. The optical system 600 also includes a lightguide 620 that conveys light rays received from the beam steering element 605 to an exit location within the lightguide 620 located in front of an eye 625 of a user. In the illustrated embodiment, the beam steering element 605 is switchable between two states that correspond to two different steering angles, as indicated by the arrows emerging from the beam steering element 605, and two different eyebox volumes, as indicated by the arrows emerging from the lightguide 620 in the direction of the eye 625.

Figure 7:
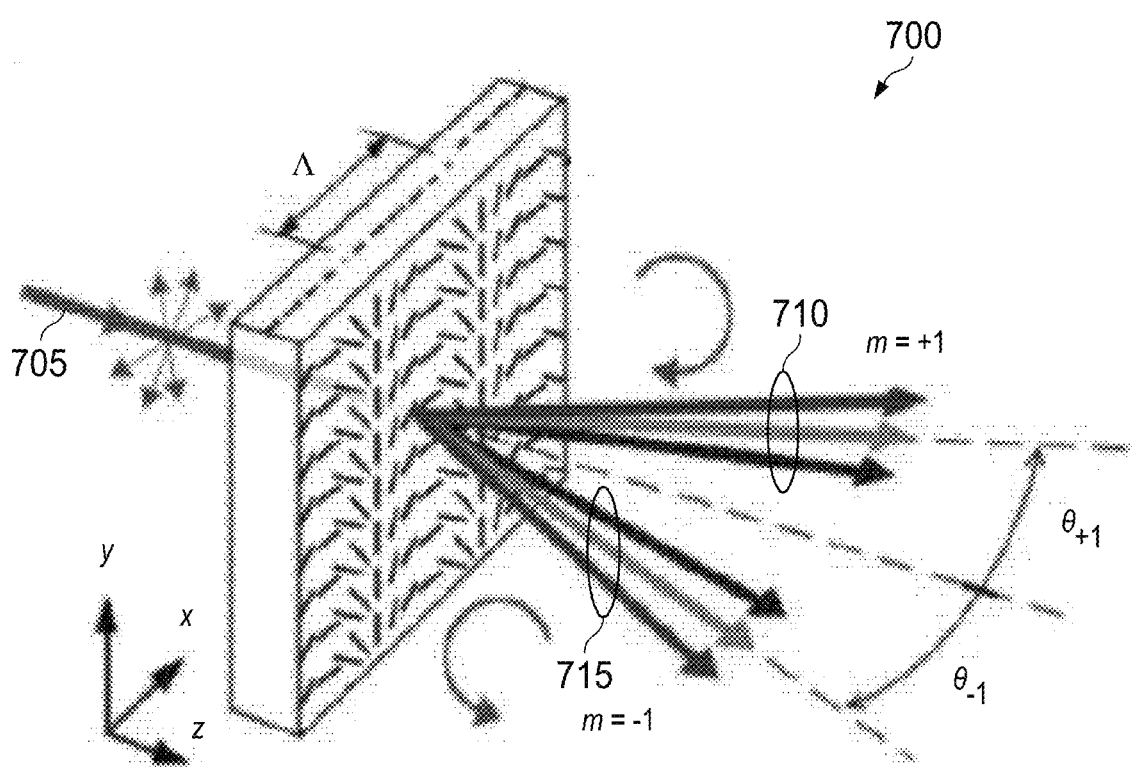
FIG. 7 is an illustration of an achromatic polarization grating according to some embodiments.

FIG. 7 is an illustration of an achromatic polarization grating 700 according to some embodiments. The achromatic polarization grating 700 is used to implement some embodiments of the optical system 305 shown in FIG. 3, the beam steering element 401 shown in FIG. 4, the beam steering element 501 shown in FIG. 5, and the beam steering element 605 shown in FIG. 6. For example, the achromatic polarization grating 700 can be implemented in combination with a switchable polarization filter (not shown in FIG. 7 in the interest of clarity) to form a switchable polarization grating. Some embodiments of the achromatic polarization grating 700 are formed of polymerizable liquid crystals that concurrently perform chromatic and polarization separation at ~100% efficiency across the visible wavelength range using two anti-symmetric chiral circular polarization gratings with opposite twist senses.

In operation, the achromatic polarization grating 700 receives unpolarized light 705, which is diffracted by the achromatic polarization grating 700 to form outgoing light 710, 715 having different circular polarizations. The outgoing light 710 represents the +1 order in the diffraction pattern and is right circularly polarized. The steering angle for the outgoing light 710 is $\theta_{+1}$. The outgoing light 715 represents the −1 order in the diffraction pattern and is left circularly polarized. The steering angle for the outgoing light 715 is $\theta_{-1}$. Either the outgoing light 710 or the outgoing light 715 is selectively provided to a lightguide (such as the lightguide 620 shown in FIG. 6) using states of a polarization dependent filter (not shown in FIG. 7 in the interest of clarity). For example, the polarization dependent filter can transmit the right circularly polarized light 710 in a first state and the left circularly polarized light 715 in a second state.

Figure 8:
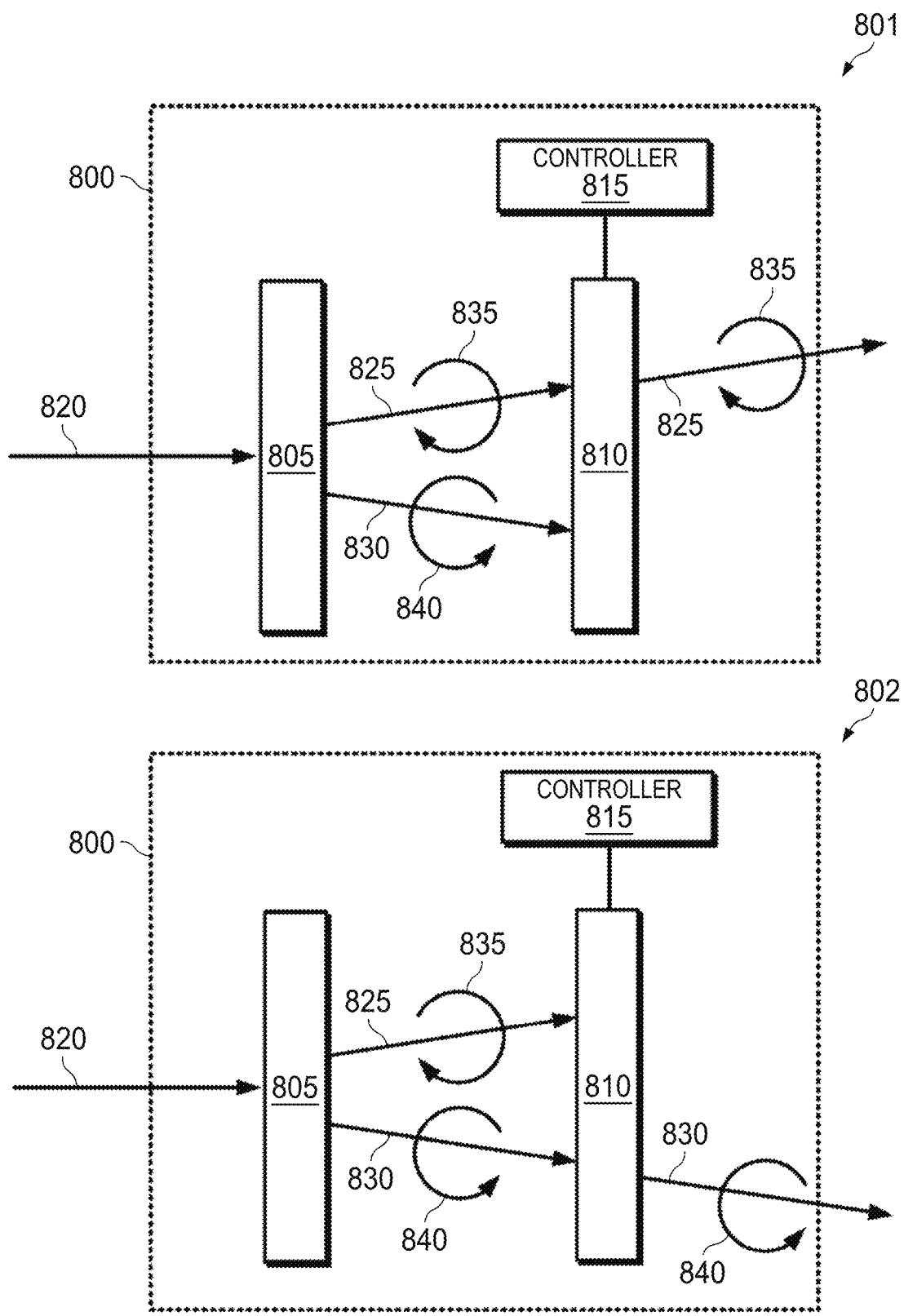
FIG. 8 is a block diagram of a beam steering element operating in a first state and a second state according to some embodiments.

FIG. 8 is a block diagram of a beam steering element 800 operating in a first state 801 and a second state 802 according to some embodiments. The beam steering element 800 is used to implement some embodiments of the optical system 305 shown in FIG. 3, the beam steering element 401 shown in FIG. 4, the beam steering element 501 shown in FIG. 5, and the beam steering element 605 shown in FIG. 6. In the illustrated embodiment, the beam steering element 800 includes a polarization grating 805 such as the achromatic polarization grating 700 shown in FIG. 7, a polarization dependent filter 810, and a controller 815 that provides signals to change the operating state of the polarization dependent filter 810 between a first operating state in which the polarization dependent filter 810 filters a first circular polarization and a second operating state in which the polarization dependent filter 810 filters a second circular polarization.

The beam steering element 800 receives unpolarized light 820, although in some embodiments the light 820 is at least partially polarized. The polarization grating 805 diffracts the light 820 into ∓1 orders that have orthogonal circular polarizations, e.g., right circular polarization and left circular polarization, respectively. The diffracted light is represented by the arrows 825, 830 and the orthogonal circular polarizations are represented as a first circular polarization 135 and a second circular polarization 840. The diffracted light 825, 830 impinges on the polarization dependent filter 810. When operating in the first state 801, the polarization dependent filter 810 filters out the light 830 having the second circular polarization 840 and only the light 825 having the first circular polarization 835 is transmitted. When operating in the second state 802, the polarization dependent filter 810 filters out the light 825 having the first circular polarization 835 and only the light 830 having the second circular polarization 840 is transmitted.

Figure 9:
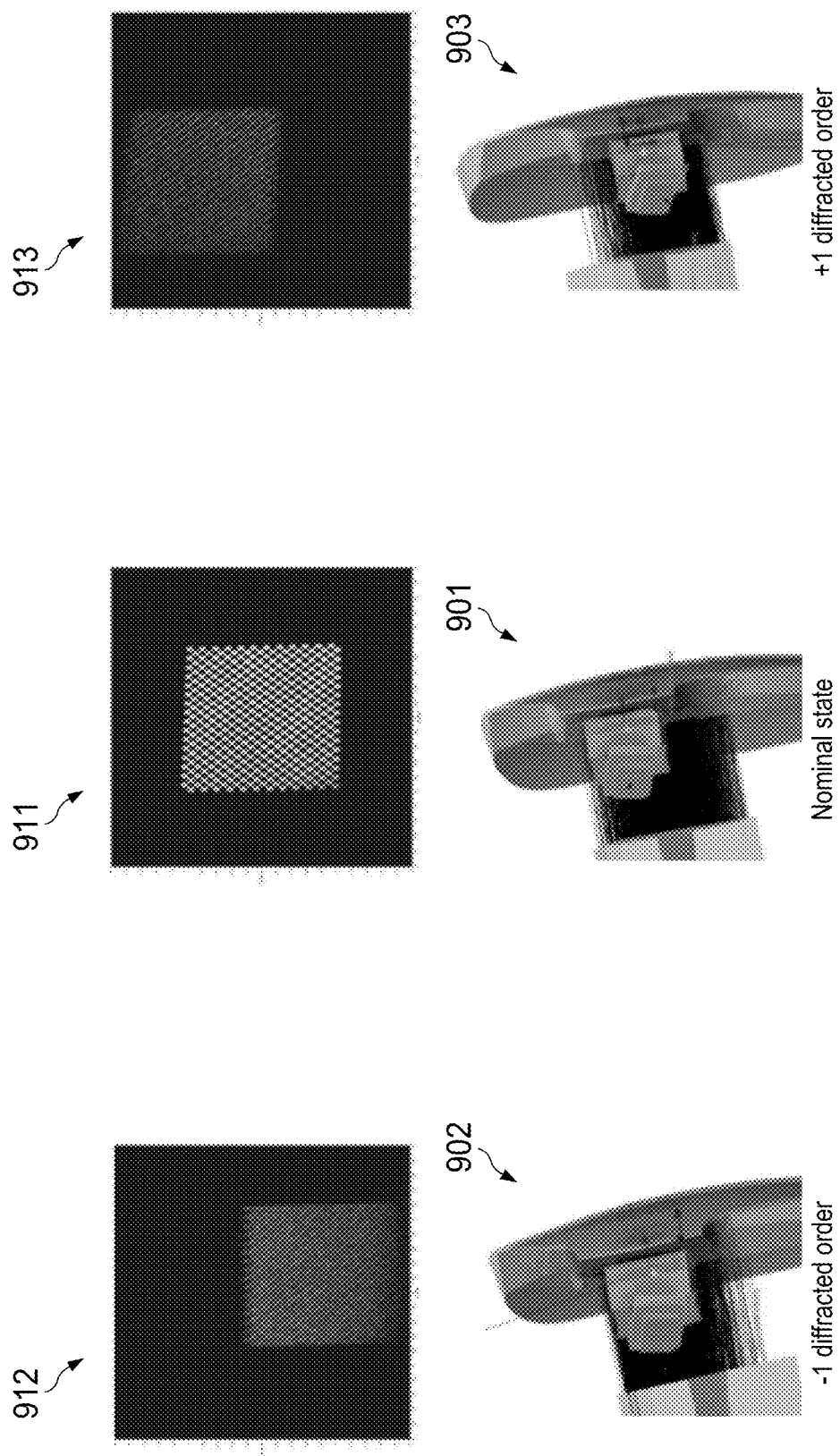
FIG. 9 is an illustration of an optical system that implements selective beam steering to generate an expanded eyebox according to some embodiments.

FIG. 9 is an illustration of an optical system that implements selective beam steering to generate an expanded eyebox according to some embodiments. The optical system 800 is illustrated in a first state 901, which is considered a nominal state because the optical system in the first state 901 is transmitting unpolarized light, i.e., a 0 order of a polarization grating implemented in the optical system. In the first state 901, a first image 911 generated by a display in the optical system appears at a first location in a field of view (FOV) of a user. When operating in a second state 902, the optical system selectively transmits light having a first circular polarization, e.g., a +1 order produced by the polarization grating implemented in the optical system. In the second state 902, a second image 912 generated by the display appears at a second location that is offset in the FOV of the user relative to the location of the first image 911. When operating in a third state 903, the optical system selectively transmits light having a second circular polarization, e.g., a −1 order produced by the polarization grating implemented in the optical system. In the third state 903, a third image 913 generated by the display appears at a third location that is offset in the FOV of the user relative to the location of the first image 911 and in the opposite direction from the second image 912.

Figure 10:
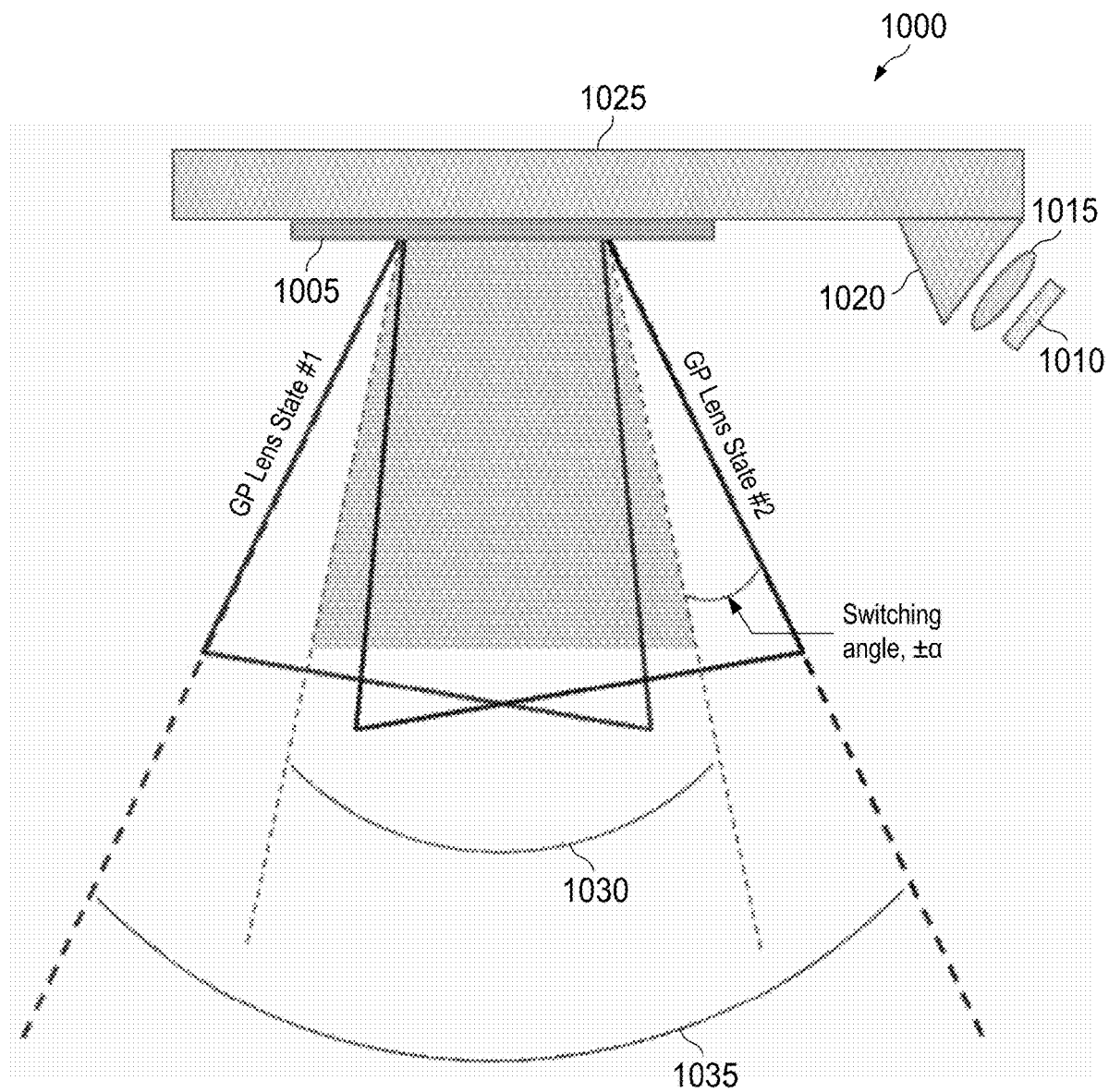
FIG. 10 is an illustration of an optical system that generates an expanded perceived field of view (FOV) using a beam steering element according to some embodiments.

FIG. 10 is an illustration of an optical system 1000 that generates an expanded perceived field of view (FOV) using a beam steering element 1005 according to some embodiments. The optical system 1000 includes a micro display 1010 that generates an image and provides light rays represented in the image to optical elements 1015, 1020 that provide the filtered light rays to a lightguide 1025 that conveys light rays to an exit location proximate the beam steering element 1005. Some embodiments of the beam steering element 1005 are implemented as a liquid crystal polarization grating, as discussed herein. In the illustrated embodiment, the beam steering element 1005 is switchable between two states that correspond to two different switching angles ($\mp\alpha$).

In the absence of the beam steering element 1005 (or at the 0-th order of a polarization grating in the beam steering element 1005), the light emerging from the lightguide 1025 covers a nominal FOV 1030. However, switching between states that correspond to the switching angles ($\mp\alpha$) expands the effective FOV perceived by the user, e.g., if the switching occurs at a sufficiently high frequency. In some embodiments, the display 1010 generates interlaced frames that represent the use of a scene from the different FOV and the frames are coordinated with switching between the states that correspond to the switching angles ($\mp\alpha$). The interlaced frames are produced by time multiplexing between a first state of the beam steering element 1005 that diffracts light into a direction indicated by the switching angle +α and a second state of the beam steering element 1005 that diffracts light into a direction indicated by the switching angle −α. The resulting effective FOV 1035 produced by the time multiplexed, interlaced frames is equal to the nominal FOV 1030 plus an additional opening angle of 2α. Although not depicted in FIG. 10, some embodiments of the optical system 1000 also include an additional beam steering element (such as the beam steering element 800 shown in FIG. 8) that is deployed between the optical elements 1015, 1020 and is switched between multiple states to provide an enhanced eyebox volume, as discussed herein.

Broadly, as described above, embodiments relate to see-through HMD devices such as glasses, helmets, and windshields which merge computer generated and real-world light to form a combined view or combined image to the user eye. To improve over previous geometries and designs, according to certain embodiments, the display is placed at either a top or a side of a lightguide that is held in place in front of the user eye or eyes by a frame in a similar fashion as a conventional pair of glasses.

The techniques used in the HMD devices described herein are applicable for use with a variety of types of displays. For example, the techniques are usable with an organic light-emitting display (OLED), an active-matrix OLED (AMO-LED) display, a liquid crystal on silicon (LCOS) display, a light-emitting diode (LED) display, a liquid crystal display (LCD), and a TFT (thin-film-transistor) LCD display. Reference to a lightguide herein includes one or more components that reflect light according to substantial or total internal reflection (TIR) between lightguide surfaces before the light is directed toward the user eye. Described embodiments combine a lightguide with certain components in a VR-based device or in an AR-based device where ambient light is combined with display light to provide a combined image to the user eye.

In some embodiments, certain aspects of the techniques described above are implemented through use one or more processors of a processing system executing software such as to drive the electronic display and provide content and to operate the PG. The software comprises one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above regarding specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the embodiments disclosed above may be altered or modified and all such variations are considered within the scope of the disclosed subject matter. Accordingly, the protection sought herein is as set forth in the claims below.

What is claimed is:

1. An eyewear device comprising:
 a lightguide having a world-side surface and an eye-side surface;
 a display oriented to emit light toward the lightguide; and
 a beam steering element comprising a first polarization grating and a polarization dependent filter positioned along an optical path between the display and the lightguide, wherein the first polarization grating is configured to diffract light emitted by the display into a plurality of orders having different polarizations, wherein each order of the plurality of orders is selectively conveyed into one eyebox of a plurality of eyeboxes, and wherein the polarization dependent filter is configured to filter light received from the first polarization grating based on a state of the polarization dependent filter.

2. The eyewear device of claim 1, wherein the different polarizations comprise a right circular polarization and a left circular polarization.

3. The eyewear device of claim 2, wherein the right circular polarization corresponds to a +1 order of polarization grating and the left circular polarization corresponds to a −1 order of polarization grating.

4. The eyewear device of claim 2, wherein the first polarization grating is configured to diffract light by a positive offset angle for right circularly polarized light and a negative offset angle for left circularly polarized light.

5. The eyewear device of claim 1, wherein the first polarization grating is an achromatic liquid crystal polarization grating.

6. The eyewear device of claim 1, wherein the polarization dependent filter is configured to filter right circularly polarized light in a first state and left circularly polarized light in a second state.

7. The eyewear device of claim 1, further comprising:
 a second polarization grating positioned proximate the eye-side surface of the lightguide, the second polarization grating being configured to selectively convey light emitted by the display into different fields of view (FOVs).

8. The eyewear device of claim 7, wherein the second polarization grating is configured to time multiplex content representative of the different FOVs to render a larger effective FOV as perceived by a user wearing the eyewear device.

9. The eyewear device of claim 8, wherein the second polarization grating comprises a switchable polarization grating configured to switch between polarizations to time multiplex the content representative of the different FOVs.

10. A eyewear device comprising:
- a lightguide having a world-side surface and an eye-side surface;
- a display oriented to emit light toward the lightguide; and
- a beam steering element comprising a switchable polarization grating positioned along an optical path between the eye-side surface of the lightguide and an eye of a user of the eyewear device, the switchable polarization grating being configured to selectively convey light emitted by the display into different fields of view FOVs).

11. The eyewear device of claim 10, wherein the beam steering element is configured to time multiplex content representative of the different FOVs to render a larger effective FOV as perceived by a user wearing the eyewear device.

12. The eyewear device of claim 11, wherein the switchable polarization grating is configured to switch between polarizations to time multiplex the content representative of the different FOVs.

* * * * *